US009927685B2

(12) United States Patent
Liao et al.

(10) Patent No.: US 9,927,685 B2
(45) Date of Patent: Mar. 27, 2018

(54) ILLUMINATION SYSTEM HAVING LIGHT-SPLITTING UNIT AND PROJECTION APPARATUS

(71) Applicant: Coretronic Corporation, Hsin-Chu (TW)

(72) Inventors: Chien-Chung Liao, Hsin-Chu (TW); Kuan-Ta Huang, Hsin-Chu (TW)

(73) Assignee: Cortronic Corporation, Hsin-Chu (TW)

( * ) Notice: Subject to any disclaimer, the term of this patent is extended or adjusted under 35 U.S.C. 154(b) by 0 days.

(21) Appl. No.: 15/072,371

(22) Filed: Mar. 17, 2016

(65) Prior Publication Data

US 2016/0327851 A1    Nov. 10, 2016

(30) Foreign Application Priority Data

May 8, 2015    (TW) .............................. 104114720 A

(51) Int. Cl.
*G03B 21/20*    (2006.01)
*G02B 27/14*    (2006.01)
(Continued)

(52) U.S. Cl.
CPC ....... *G03B 21/204* (2013.01); *G02B 17/0808* (2013.01); *G02B 27/141* (2013.01);
(Continued)

(58) Field of Classification Search
CPC .............. G03B 21/204; G03B 21/2013; G03B 21/2066; G03B 21/208; G02B 17/0808; G02B 27/141
See application file for complete search history.

(56) References Cited

U.S. PATENT DOCUMENTS 4,313,024 A    1/1982 Home
5,568,577 A    10/1996 Hardy, Jr.
(Continued)

FOREIGN PATENT DOCUMENTS

CN    101936505    1/2011
CN    202177773    3/2012
(Continued)

OTHER PUBLICATIONS

"Office Action of Taiwan Counterpart Application", dated Aug. 15, 2016, p. 1-p. 3, in which the listed references were cited.
(Continued)

*Primary Examiner* — Bao-Luan Le
(74) *Attorney, Agent, or Firm* — JCIPRNET

(57) ABSTRACT

An illumination system including an excitation light source module configured to emit an excitation beam, a wavelength conversion device, and a light-splitting unit on a transmission path of the excitation beam and between the excitation light source module and the wavelength conversion device is provided. The light-splitting unit includes a transparent substrate and a first optical film with a hole through which the excitation beam is transmitted to the wavelength conversion device. A wavelength conversion area and a diffusion area of the wavelength conversion device cut into the transmission path by turns. The wavelength conversion area converts the excitation beam into a conversion beam transmitted to the light-splitting unit. The diffusion area reflects the excitation beam to the light-splitting unit; the first optical film reflects the excitation beam coming from the diffusion area. Wavelengths of the conversion beam and excitation beam are different. A projection apparatus is also provided.

20 Claims, 7 Drawing Sheets

(51) Int. Cl.
*G02B 17/08* (2006.01)
*G03B 33/08* (2006.01)

(52) U.S. Cl.
CPC ....... *G03B 21/208* (2013.01); *G03B 21/2013* (2013.01); *G03B 21/2066* (2013.01); *G03B 33/08* (2013.01)

(56) References Cited

U.S. PATENT DOCUMENTS

| | | | | |
|---|---|---|---|---|
| 8,348,432 | B2* | 1/2013 | Miyazaki | G02B 26/008 353/31 |
| 8,616,708 | B2* | 12/2013 | Masuda | G03B 21/14 353/84 |
| 8,662,673 | B2* | 3/2014 | Miyazaki | G02B 26/008 353/31 |
| 8,690,343 | B2* | 4/2014 | Tanaka | G03B 21/2013 348/743 |
| 8,740,390 | B2* | 6/2014 | Masuda | G03B 21/14 353/31 |
| 8,823,886 | B2* | 9/2014 | Tanaka | G02B 27/1046 349/8 |
| 8,840,253 | B2 | 9/2014 | Kitano | |
| 9,075,293 | B2* | 7/2015 | Zhang | F21V 9/00 |
| 9,151,471 | B2* | 10/2015 | Ogura | F21V 13/08 |
| 9,395,611 | B2* | 7/2016 | Nishikawa | G03B 21/2013 |
| 9,645,480 | B2* | 5/2017 | Liao | G03B 21/204 |
| 2010/0328617 | A1* | 12/2010 | Masuda | G03B 21/14 353/31 |
| 2010/0328627 | A1* | 12/2010 | Miyazaki | G02B 26/008 353/85 |
| 2011/0075103 | A1* | 3/2011 | Ogawa | G03B 33/08 353/31 |
| 2012/0133903 | A1* | 5/2012 | Tanaka | G03B 21/2013 353/31 |
| 2012/0327374 | A1* | 12/2012 | Kitano | G03B 21/16 353/31 |
| 2013/0002972 | A1* | 1/2013 | Tanaka | G02B 27/1046 349/8 |
| 2013/0107225 | A1* | 5/2013 | Miyazaki | G02B 26/008 353/31 |
| 2013/0194551 | A1* | 8/2013 | Zhang | F21V 9/00 353/31 |
| 2013/0242273 | A1* | 9/2013 | Weichmann | G02B 26/008 353/84 |
| 2013/0250253 | A1* | 9/2013 | Ogura | F21V 13/08 353/85 |
| 2013/0322056 | A1* | 12/2013 | Konuma | F21V 13/14 362/84 |
| 2014/0078472 | A1* | 3/2014 | Masuda | G03B 21/142 353/31 |
| 2014/0078475 | A1* | 3/2014 | Masuda | G03B 21/14 353/84 |
| 2014/0111775 | A1* | 4/2014 | Nishikawa | G03B 21/2013 353/31 |
| 2014/0285774 | A1* | 9/2014 | Tajiri | G03B 21/28 353/38 |
| 2014/0347721 | A1 | 11/2014 | Bittner et al. | |
| 2015/0177599 | A1* | 6/2015 | Huang | G03B 21/142 353/31 |
| 2015/0222864 | A1* | 8/2015 | Inoko | F21V 9/14 353/31 |
| 2015/0362830 | A1* | 12/2015 | Liao | G03B 21/204 353/31 |
| 2016/0282709 | A1* | 9/2016 | Nishikawa | G03B 21/2013 |

FOREIGN PATENT DOCUMENTS

| | | | | |
|---|---|---|---|---|
| CN | 102890398 | | 1/2013 | |
| JP | 2008286874 | A | 11/2008 | |
| JP | 2011013320 | A * | 1/2011 | ........ G02B 26/008 |
| TW | 201213858 | A | 4/2012 | |
| TW | 201222135 | | 6/2012 | |

OTHER PUBLICATIONS

"Office Action of China Counterpart Application," dated Jul. 28, 2017, p. 1-p. 7, in which the listed reference was cited.

* cited by examiner ical # US 9,927,685 B2

ILLUMINATION SYSTEM HAVING LIGHT-SPLITTING UNIT AND PROJECTION APPARATUS

CROSS-REFERENCE TO RELATED APPLICATION

This application claims the priority benefit of Taiwan application serial no. 104114720, filed on May 8, 2015. The entirety of the above-mentioned patent application is hereby incorporated by reference herein and made a part of this specification.

FIELD OF THE INVENTION

The invention relates to an optical system and an optical apparatus; more particularly, the invention relates to an illumination system and a projection apparatus where the illumination system is applied.

DESCRIPTION OF RELATED ART

With the development of science and technologies, solid state illuminations (SSI) including light emitting diodes (LED) or laser diodes (LD) have been extensively applied as light sources required by projection apparatuses. The light emitting spectrum of the SSI allows the SSI to act as the pure color light source applied in the projection apparatus, and the light source required by projecting images can be provided after wavelength conversion substance (e.g., fluorescent powder) is excited.

However, in order for the beam emitted by the SSI and the beam converted by the wavelength conversion substance to act as the light source required by projection images, the SSI and the wavelength conversion substance may additionally require optical devices (e.g., lenses, field lenses, reflective mirrors, and so forth) to generate appropriate light paths. For instance, a wavelength conversion unit carrying the wavelength conversion substance may need a light transmission area that allows the beam emitted by the SSI to pass through, and the beam passing through the wavelength conversion unit may require an additional optical device for adjusting the light path; accordingly, it is rather difficult to reduce the size of the projection apparatus.

The information disclosed in Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an illumination system having a relatively small volume, and the illumination system is capable of providing beams with good quality.

The invention is directed to a projection apparatus having a relatively small volume, and the projection apparatus is capable of projecting images with good quality.

In an embodiment of the invention, an illumination system including an excitation light source module, a wavelength conversion device, and a light-splitting unit is provided. The excitation light source module is configured to emit an excitation beam. The wavelength conversion device and the light-splitting unit are located on a transmission path of the excitation beam, and the light-splitting unit is located between the excitation light source module and the wavelength conversion device. The light-splitting unit includes a transparent substrate and a first optical film that is located on the transparent substrate and has a hole, and the excitation beam emitted from the excitation light source module is transmitted to the wavelength conversion device through the hole. The wavelength conversion device has at least one wavelength conversion area and a diffusion area, and the at least one wavelength conversion area and the diffusion area cut into the transmission path of the excitation beam by turns. The at least one wavelength conversion area cutting into the transmission path of the excitation beam reflects the excitation beam and converts the excitation beam into a conversion beam transmitted to the light-splitting unit. Here, a wavelength of the conversion beam is different from a wavelength of the excitation beam. The diffusion area cutting into the transmission path of the excitation beam reflects the excitation beam to the light-splitting unit, and the first optical film of the light-splitting unit reflects the excitation beam that comes from the diffusion area.

In an embodiment of the invention, a projection apparatus that includes the illumination system, a light valve, and a lens device is provided. The light valve is located on the transmission path of the excitation beam and the conversion beam from the light-splitting unit of the illumination system, so as to modulate the conversion beam and the excitation beam to generate an image beam. The lens device is located on a transmission path of the image beam.

In view of the above, the light-splitting unit of the illumination system provided in an embodiment of the invention has the hole. With the hole of the light-splitting unit and the wavelength conversion device, the conversion beam and the excitation beam can be generated via reflection. The illumination system described herein does not require any additional optical device for reflecting or refracting the conversion beam and the excitation beam; hence, the illumination system can have the reduced volume, and the optical quality of the conversion beam can be consistent with that of the excitation beam. Moreover, the projection apparatus provided herein is equipped with said illumination system and can thus have the reduced volume. In addition, the illumination system can provide the uniform beams, the projection apparatus is capable of providing the images with favorable quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting.

On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
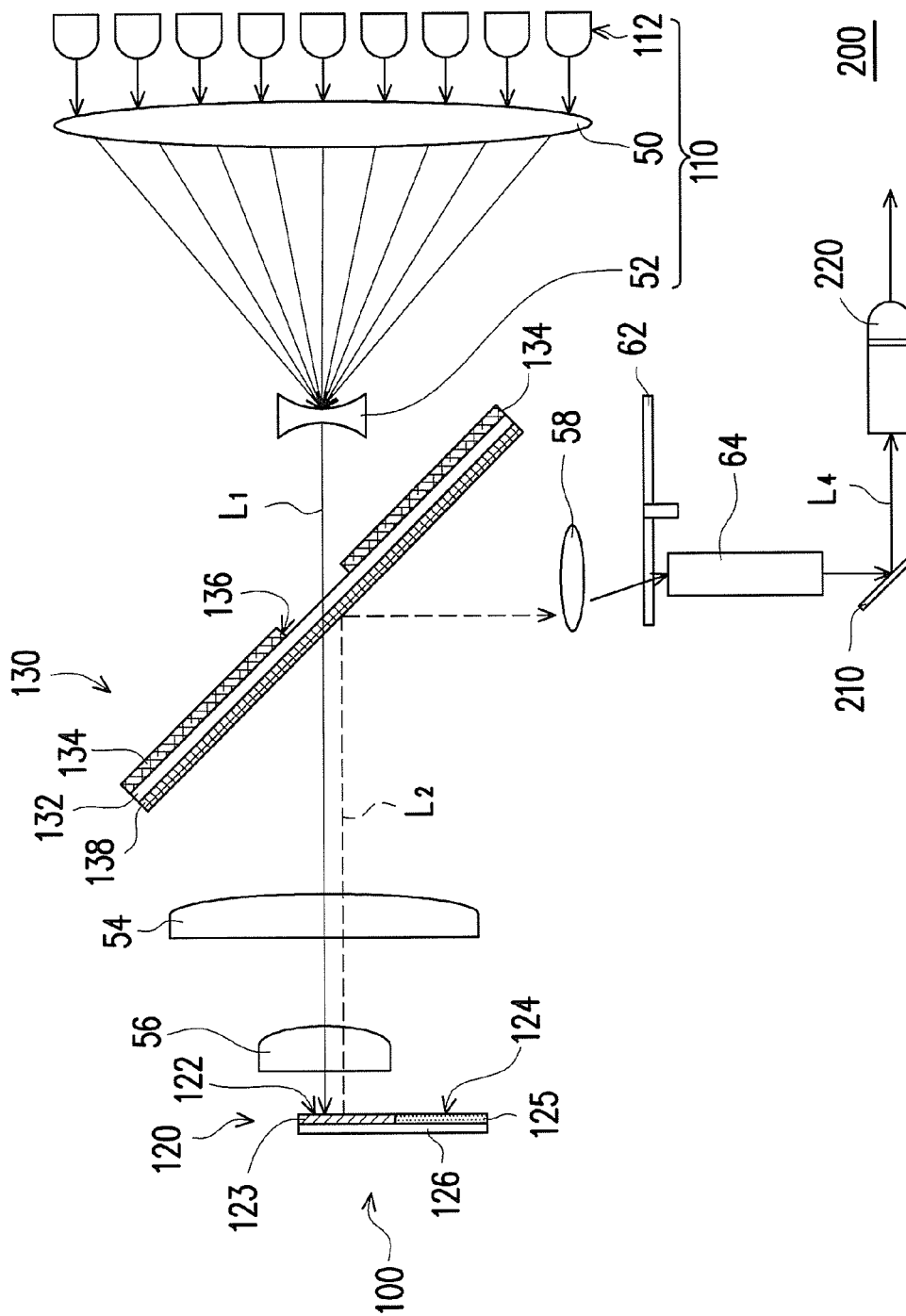
FIG. 1A and FIG. 1B are schematic views illustrating a projection apparatus according to a first embodiment of the invention.
Figure 1B:
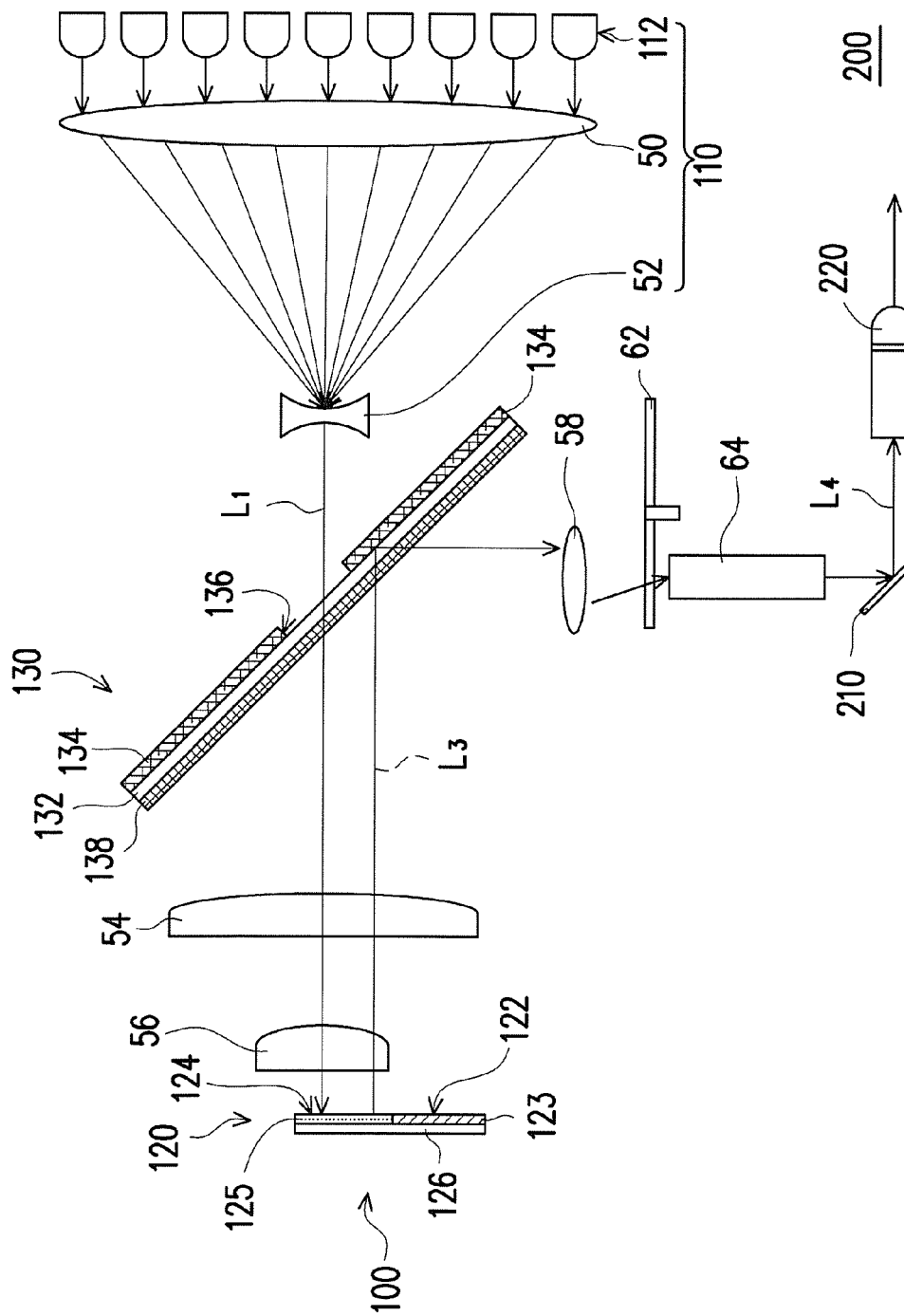

FIG. 1A and FIG. 1B are schematic views illustrating a projection apparatus according to a first embodiment of the invention. With reference to FIG. 1A and FIG. 1B, in the first embodiment of the invention, the projection apparatus 200 includes an illumination system 100 that includes an excitation light source module 110, a wavelength conversion device 120, and a light-splitting unit 130. The excitation light source module 110 is configured to emit an excitation beam L1, and the wavelength conversion device 120 and the light-splitting unit 130 are located on a transmission path of the excitation beam L1. The light-splitting unit 130 includes a transparent substrate 132 and a first optical film 134 having a hole 136. The first optical film 134 is located on the transparent substrate 132. The hole 136 is located in a center of the first optical film 134, which should however not be construed as a limitation to the invention. Since the light-splitting unit 130 is located between the excitation light source module 110 and the wavelength conversion device 120, the excitation beam L1 emitted from the excitation light source module 110 passes through the transparent substrate 132 via the hole 136 of the first optical film 134 of the light-splitting unit 130 and then is transmitted to the wavelength conversion device 120.

Figure 2:
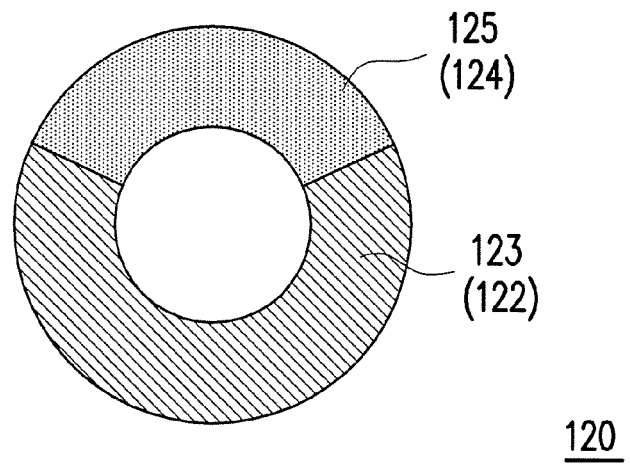
FIG. 2 is a top view illustrating a wavelength conversion device according to a first embodiment of the invention.

FIG. 2 is a top view illustrating a wavelength conversion device according to a first embodiment of the invention. With reference to FIG. 2, in the embodiment, the wavelength conversion device 120 has a wavelength conversion area 122 and a diffusion area 124. The wavelength conversion area 122 and the diffusion area 124 cut into the transmission path of the excitation beam L1 by turns.

As shown in FIG. 1A and FIG. 2, when the wavelength conversion area 122 of the wavelength conversion device 120 cuts into the transmission path of the excitation beam L1, the wavelength conversion area 122 converts the excitation beam L1 into a conversion beam L2 and reflects the conversion beam L2 to the light-splitting unit 130. Here, a wavelength of the conversion beam L2 is different from a wavelength of the excitation beam L1.

As shown in FIG. 1B and FIG. 2, when the diffusion area 124 of the wavelength conversion device 120 cuts into the transmission path of the excitation beam L1, the diffusion area 124 reflects the excitation beam L1 to generate an excitation beam L3. The reflected excitation beam L3 is transmitted to the light-splitting unit 130, and the first optical film 134 of the light-splitting unit 130 reflects the excitation beam L3 that comes from the diffusion area 124 of the wavelength conversion device 120.

That is, the excitation beam L1 that passes through the hole 136 of the light-splitting unit 130 is reflected to generate the excitation beam L3 or is converted into the conversion beam L2 sequentially by the wavelength conversion device 120 provided in the embodiment. The conversion beam L2 and the excitation beam L3 are reflected by the wavelength conversion device 120 and are transmitted toward the light-splitting unit 130. The light-splitting unit 130 having the first optical film 134 then reflects the conversion beam L2 and the reflected excitation beam L3 to form the light source supplied by the illumination system 100. In light of the foregoing, due to the light-splitting unit 130 having the hole 136 and the wavelength conversion device 120 of the illumination system 100 described herein, the transmission path of the reflected excitation beam L3 and the transmission path of the conversion beam L2 may be substantially the same; that is, the transmission path of the reflected excitation beam L3 is able to be regulated without additional optical devices, and thereby the overall volume of the illumination system 100 can be reduced.

Particularly, with reference to FIG. 1A and FIG. 1B, in the embodiment, the projection apparatus 200 includes the above-described illumination system 100, a light valve 210, and a lens device 220. The light valve 210 is located on the transmission path of the excitation beam L3 and the conversion beam L2 coming from the light-splitting unit 130 of the illumination system 100, so as to modulate the conversion beam L2 and the excitation beam L3 to generate an image beam L4. The lens device 220 is located on a transmission path of the image beam L4. The illumination system 100 has the reduced volume, and thus the overall volume of the projection apparatus 200 can be reduced as well. In another aspect, the light path of the conversion beam L2 is substantially the same as the light path of the reflected excitation beam L3 in the illumination system 100; therefore, the beams transmitted to the light valve 210 can have consistent quality, and the image beam L4 with the favorable image quality can be provided. To be specific, the projection apparatus 200 provided in the embodiment further includes a color wheel 62 and an integration rod 64. The illumination system 100 further includes lenses 54, 56, and 58. The above optical devices are configured to transmit the conversion beam L2 and the reflected excitation beam L3 with the improved optical quality to the light valve 210. However, the invention is not limited thereto. In other embodiments of the invention, the types, the number, and the locations of said above-mentioned optical devices can be properly adjusted according to actual demands.

With reference to FIG. 1A, FIG. 1B, and FIG. 2, according to the embodiment, the wavelength conversion device 120 is a rotatable wheel which is adapted to rotate around a central axis, such that the wavelength conversion area 122 and the diffusion area 124 are allowed to cut into the transmission path of the excitation beam L1 by turns. The wavelength conversion device 120 includes a reflective substrate 126 and a fluorescent layer 123. The wavelength conversion device 120 includes surface micro-structures 125 that are located in the diffusion area 124, and the fluorescent layer 123 and the surface micro-structures 125 are located on the same surface of the reflective substrate 126. The fluorescent layer 123 is located in the wavelength conversion area 122. The fluorescent layer 123 in the wavelength conversion area 122 is configured to convert the excitation beam L1 transmitting from the light splitting unit 130 into the conversion beam L2. The surface micro-structures 125 in the diffusion area 124 are configured to reflect the excitation beam L1 transmitting from the light splitting unit 130 to generate the diffused excitation beam L3. The excitation beam L3 and the conversion beam L2 reflected by the reflective substrate 126 have a diffusion angle, and thus the conversion beam L2 and the excitation beam L3 may be converted by field lenses 54 and 56 into beams that are adapted to be reflected by the light-splitting unit 130, for instance. Besides, the excitation beam L1 passing through the light-splitting unit 130 is converged onto the wavelength conversion device 120 by the lenses 54 and 56; here, the excitation beam L3 partially passes through the light-splitting unit 130.

Figure 3:
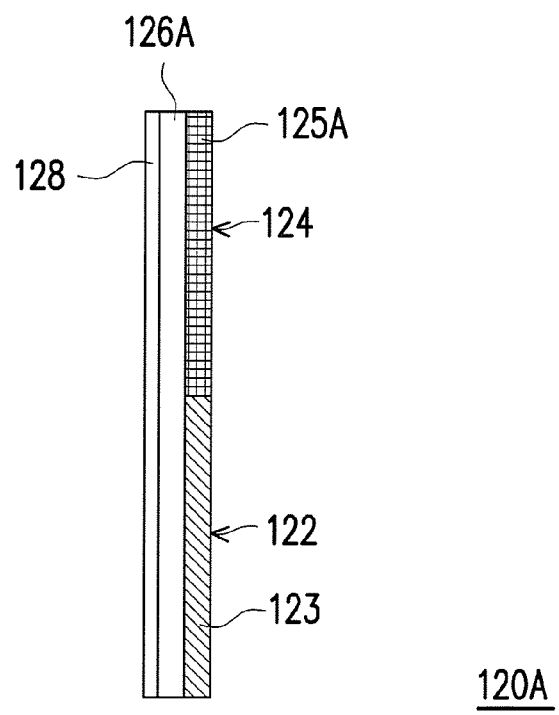
FIG. 3 is a schematic view illustrating a wavelength conversion device according to another embodiment of the invention.

In other embodiments of the invention, the wavelength conversion device may not be limited to include the surface micro-structures 125 in the diffusion area 124, and may further include a diffusion film located in the diffusion area on the reflective substrate 126. FIG. 3 is a schematic view illustrating a wavelength conversion device according to another embodiment of the invention. With reference to FIG. 1A, FIG. 1B and FIG. 3, in another embodiment of the invention, the wavelength conversion device 120A includes a transparent substrate 126A, a fluorescent layer 123, a diffusion film 125A, and a reflective layer 128. The fluorescent layer 123 and the diffusion film 125A are located on the transparent substrate 126A and are adjoined each other. The fluorescent layer 123 and the diffusion film 125A are respectively disposed in the wavelength conversion area 124 and the diffusion area 124. The fluorescent layer 123 is configured to convert the excitation beam L1 into the conversion beam L2. The reflective layer 128 is disposed on the transparent substrate 126A. A distribution range of the reflective layer 128 covers the wavelength conversion area 122 and the diffusion area 124, such that the reflective layer 128 is able to reflect the conversion beam L2 coming from the fluorescent layer 123 and the diffused excitation beam L3 coming from the diffusion film 125A. Besides, the reflective layer 128 is located on one side of the transparent substrate 126A, and the fluorescent layer 123 and the diffusion film 125A are located on the opposite side of the transparent substrate 126A.

Particularly, according to the first embodiment of the invention, the light-splitting unit 130 shown in FIG. 1A and FIG. 1B further includes a second optical film 138 located on the transparent substrate 132. The second optical film 138 serves to reflect the conversion beam L2 coming from the wavelength conversion area 122 of the wavelength conversion device 120, such that the illumination system 100 can provide the quality light source. To be specific, the excitation light source 110 described in the embodiment is, for instance, adapted to emit blue light (e.g., the excitation beam L1), and the fluorescent layer 123 of the wavelength conversion area 122 serves to convert the blue light (e.g., the excitation beam L1) into yellow light (e.g., the conversion beam L2). The first optical film 134 is a dichroic film or a reflective film that reflects the blue light, and the second optical film 138 is a dichroic film that reflects the yellow light and allows the blue light to pass through. Namely, the second optical film 138 allows the excitation beam L1 and the reflected excitation beam L3 to pass through and is adapted to reflect the conversion beam L2; therefore, when the diffusion area 124 of the wavelength conversion device 120 cuts into the transmission path of the excitation beam L1, the reflected excitation beam L3 sequentially passes through the second optical film 138 and the transparent substrate 132, and is then reflected by the first optical film 136. However, the invention is not limited thereto.

According to another embodiment of the invention, the first optical film 134 may be a first dichroic film, and the second optical film 138 may be a second dichroic film. The first dichroic film 134 allows the conversion beam L2 to pass through and is adapted to reflect the excitation beam L1 and the reflected excitation beam L3; the second dichroic film 138 allows the excitation beam L1 and the reflected excitation beam L3 to pass through and is adapted to reflect the conversion beam L2. Namely, the first optical film 134 is adapted to reflect the blue light and allows the yellow light to pass through, for instance, and the second optical film 138 is adapted to reflect the yellow light and allows the blue light to pass through, for instance. Hence, the light-splitting unit 130 provided in the embodiment allows the excitation beam L1 that comes from the excitation light source module 110 to pass through the hole 136 of the light-splitting unit 130 and reflects the conversion beam L2 and the excitation beam L3 coming from the wavelength conversion device 120. In the embodiment, the hole 136 of the first optical film 134 accounts for approximately 5% of the area of the first optical film 134, and thus about 95% of the area of the first optical film 134 which is able to reflect the excitation beam L3 coming from the wavelength conversion device 120. Accordingly, as to the excitation beam L3 coming from the wavelength conversion device 120, the light-splitting unit 130 can have the satisfactory reflection efficiency.

Figure 4A:
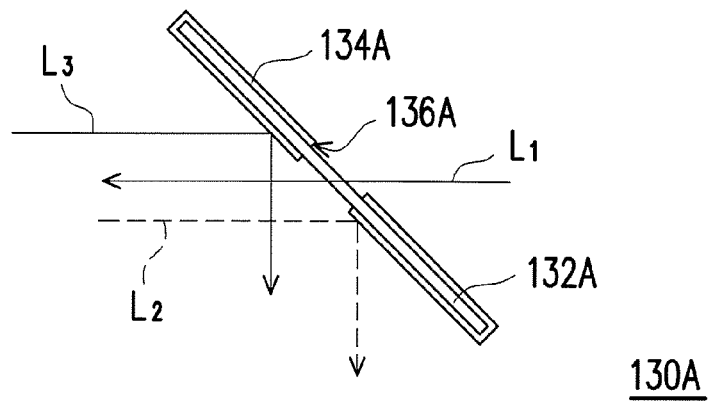
FIG. 4A is a schematic view illustrating a light-splitting unit according to another embodiment of the invention.

FIG. 4A is a schematic view illustrating a light-splitting unit according to another embodiment of the invention. With reference to FIG. 4A, in another embodiment of the invention, the first optical film 134A of the light-splitting unit 130A is a reflective film, i.e., a reflective film that can reflect both the conversion beam L2 and the excitation beam L3 is coated or plated onto the transparent substrate 132A made of glass, for instance; meanwhile, the first optical film 134A is still equipped with the hole 136A to expose the transparent substrate 132A. Hence, the light-splitting unit 130A described herein has the hole 136A that can be penetrated by the excitation beam L1 and also has the first optical film 134A that can reflect the conversion beam L2 and the reflected excitation beam L3. The transparent substrate 132A may have a diffusing function to diffuse the excitation beam L1 coming from the excitation light source module after the excitation beam L1 passes through the hole 136A of the light-splitting unit 130A.

Figure 4B:
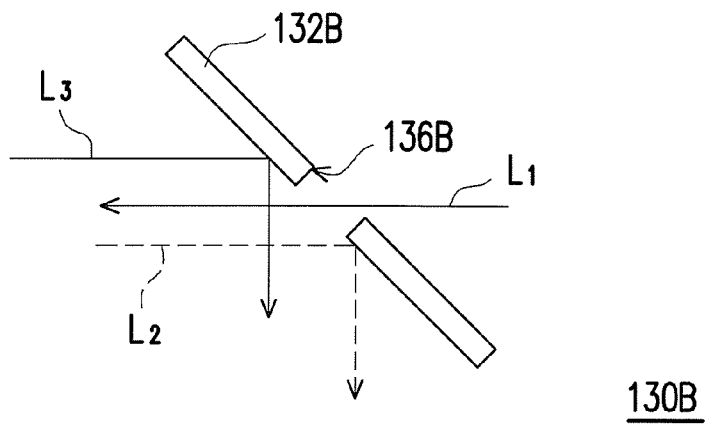
FIG. 4B is a schematic view illustrating a light-splitting unit according to yet another embodiment of the invention.

FIG. 4B is a schematic view illustrating a light-splitting unit according to yet another embodiment of the invention. With reference to FIG. 4B, in another embodiment of the invention, the light-splitting unit 130B may be formed by the reflective substrate 132B having the hole 136B. Hence, the light-splitting unit 130B described herein has the hole 136B that can be penetrated by the excitation beam L1, and the light-splitting unit 130B is also capable of reflecting the conversion beam L2 and the reflected excitation beam L3.

Figure 4C:
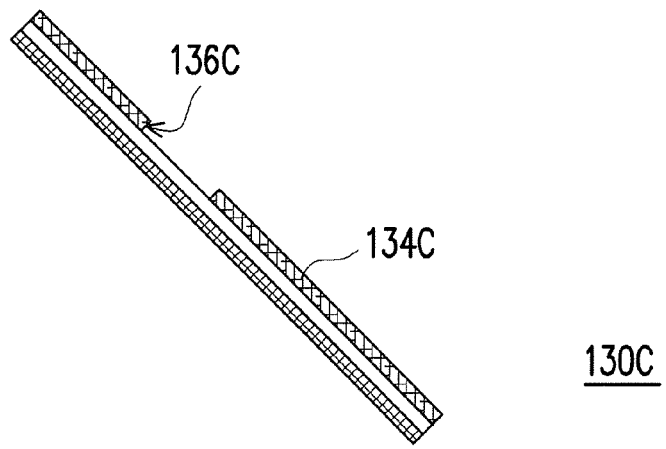
FIG. 4C is a schematic view illustrating a light-splitting unit according to yet another embodiment of the invention.

FIG. 4C is a schematic view illustrating a light-splitting unit according to yet another embodiment of the invention. In the light-splitting unit provided in the embodiment, the hole may not be located in the center of the first optical film. With reference to FIG. 4C, in another embodiment of the invention, the hole 136C of the first optical film 134C of the light-splitting unit 130C may deviate from the center of the first optical film 134C, which should however not be construed as a limitation to the invention. In view of the above, the light-splitting unit provided above can be formed with ease, i.e., it is not necessary to assemble or adhere plural optical films together; as a result, the optical quality is not affected by the degradation of the adhesives applied for adhesion, and the durability of the resultant light-splitting unit is rather satisfactory.

Figure 5A:
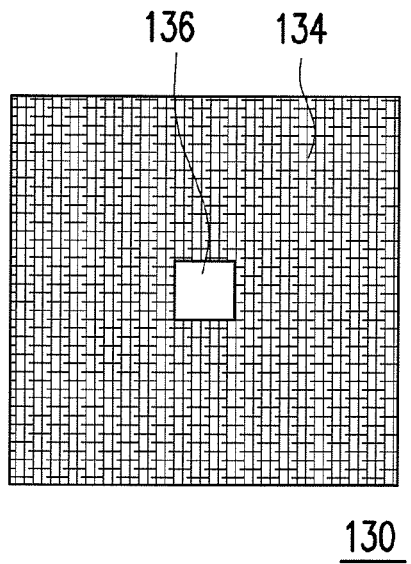
FIG. 5A is a schematic view illustrating a light-splitting unit according to the first embodiment of the invention.
Figure 5B:
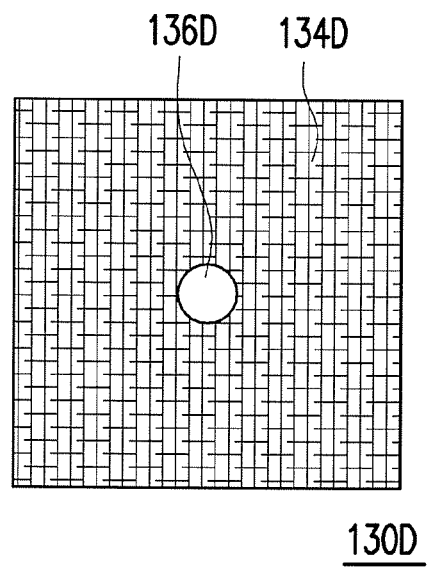
FIG. 5B-FIG. 5D are schematic views illustrating a light-splitting unit according to several embodiments of the invention.
Figure 5C:
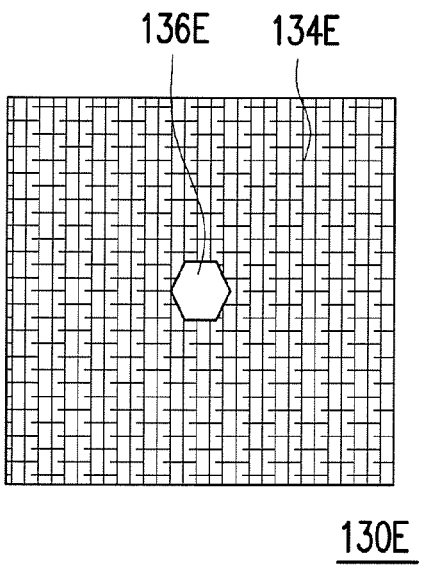
Figure 5D:
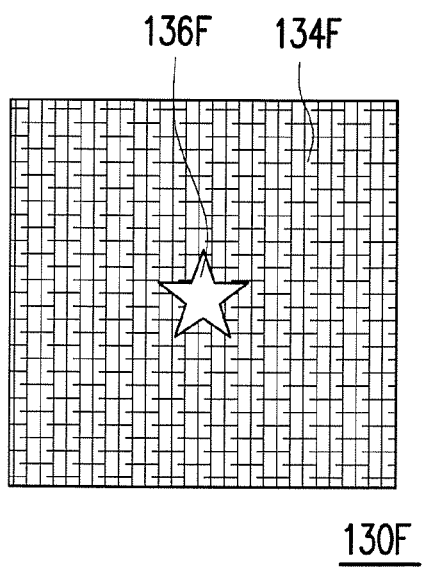

FIG. 5A is a schematic view illustrating a light-splitting unit according to the first embodiment of the invention. FIG. 5B-FIG. 5D are schematic views illustrating a light-splitting unit according to several embodiments of the invention. With reference to FIG. 5A, in the first embodiment of the invention, the shape of the hole 136 of the first optical film 134 is rectangular or square, which should however not be construed as a limitation to the invention. With reference to FIG. 5B, in another embodiment of the invention, the shape of the hole 136D of the first optical film 134D of the light-splitting unit 130D is circular, for instance. With reference to FIG. 5C, in another embodiment of the invention, the shape of the hole 136E of the first optical film 134E of the light-splitting unit 130E is hexagonal, for instance. With reference to FIG. 5D, in another embodiment of the invention, the shape of the hole 136F of the first optical film 134F of the light-splitting unit 130F is irregular, for instance. That is, the shape of the hole is not limited herein.

From another perspective, as shown in FIG. 1A and FIG. 1B, the excitation light source module 110 provided in the first embodiment of the invention includes a plurality of laser diodes 112 and lenses 50 and 52, for instance. The lenses 50 and 52 are located on the transmission paths of the laser beams emitted by the laser diodes 112 and are sequentially arranged between the laser diodes 112 and the light-splitting unit 130. The laser beams emitted by the laser diodes 112 are converged by the lens 50 and are then refracted by the lens 52 to generate the collimated excitation beam L1, such that the excitation beam L1 can be transmitted via the hole 136 of the light-splitting unit 130 in an efficient manner; however, the invention is not limited thereto.

Figure 6A:
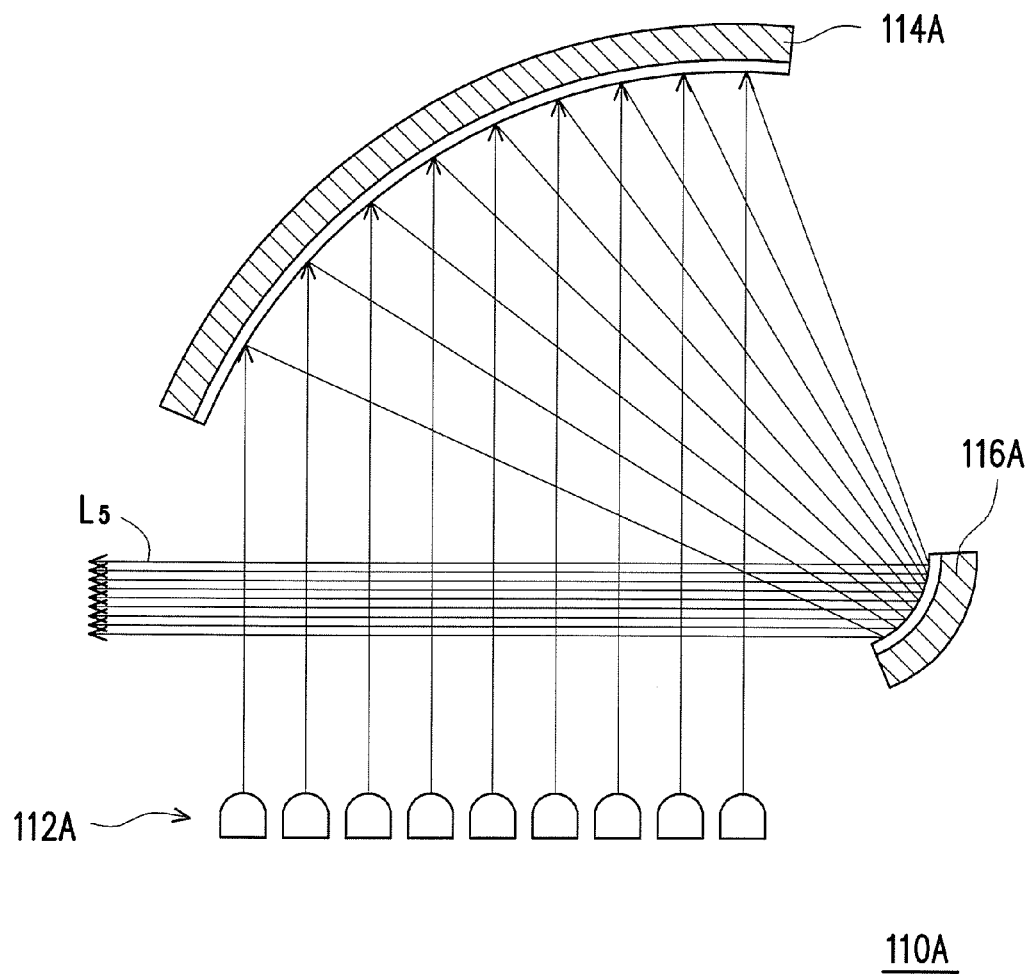
FIG. 6A and FIG. 6B are schematic views illustrating an excitation light source module according to several embodiments of the invention.
Figure 6B:
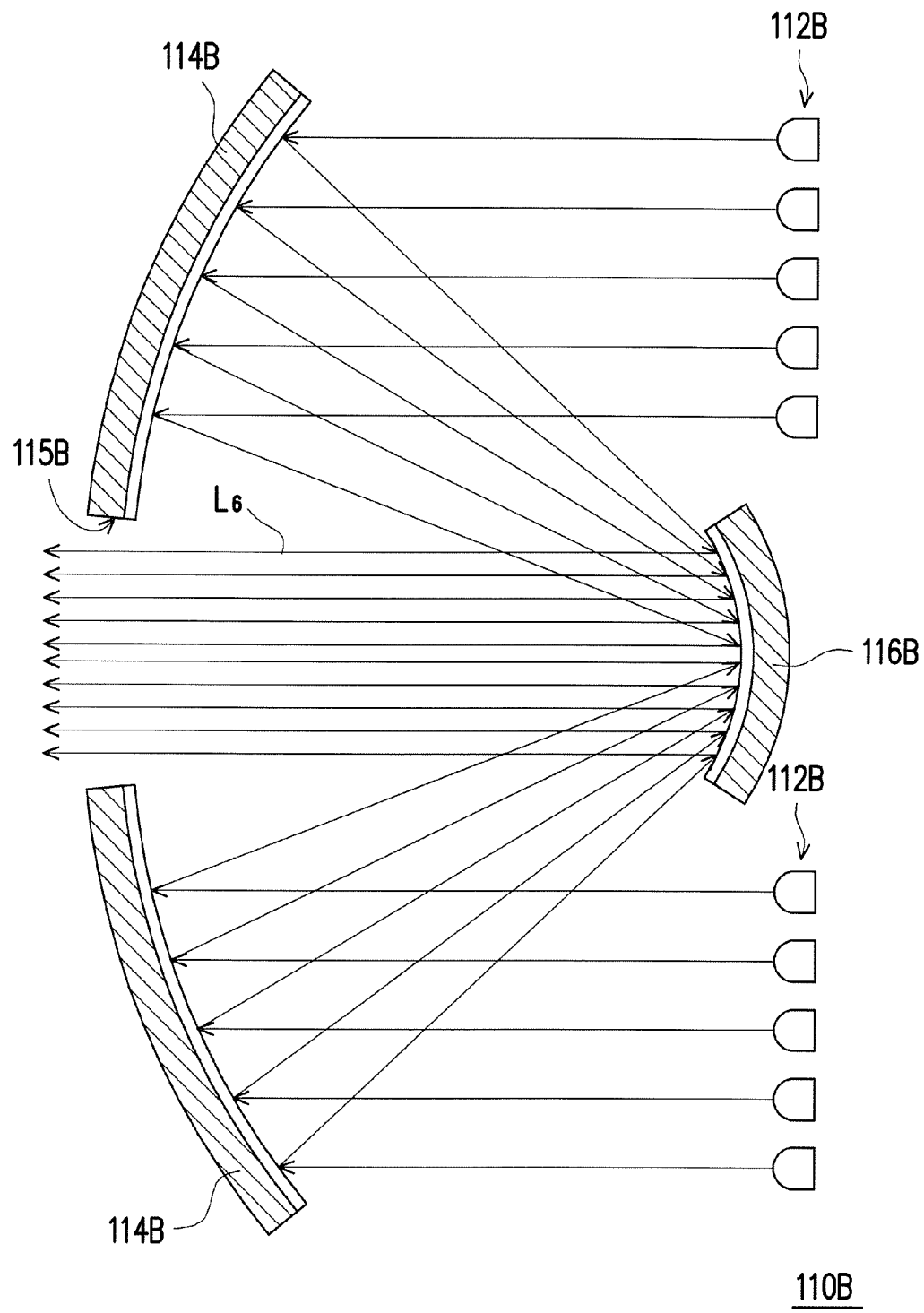

FIG. 6A and FIG. 6B are schematic views illustrating an excitation light source according to several embodiments of the invention. With reference to FIG. 6A, in another embodiment of the invention, the excitation light source module 110A may further include a plurality of laser diodes 112A, a first curved reflective mirror 114A, and a second curved reflective mirror 116A. The laser diodes 112A respectively emit a plurality of laser beams. The first curved reflective mirror 114A and the second curved reflective mirror 116A are located on the transmission paths of the laser beams emitted by the laser diodes 112A. The first curved reflective mirror 114A is disposed in an inclined manner with respect to the transmission paths of the laser beams coming from the laser diodes 112A. The first curved reflective mirror 114A reflects the laser beams emitted by the laser diodes 112A to the second curved reflective mirror 116A, the second curved reflective mirror 116A is disposed in an inclined manner with respect to the transmission paths of the laser beams coming from the first curved reflective mirror 114A, and the second curved reflective mirror 116A reflects the laser beams coming from the first curved reflective mirror 114A and generates the collimated excitation beam L5. In the embodiment, the reflective surfaces of the first and second curved reflective mirrors 114A and 116A are concave surfaces. Thereby, the collimated excitation beam L5 emitted by the excitation light source module 110A can be transmitted to the wavelength conversion device through the hole of the light-splitting unit in an efficient manner according to the embodiment.

With reference to FIG. 6B, in another embodiment of the invention, the excitation light source module 110B may further include a plurality of laser diodes 112B, a first curved reflective mirror 114B having an opening 115B, and a second curved reflective mirror 116B. The laser diodes 112B respectively emit a plurality of laser beams. The first curved reflective mirror 114B and the second curved reflective mirror 116B are located on the transmission paths of the laser beams emitted by the laser diodes 112B. The first curved reflective mirror 114B reflects the laser beams coming from the laser diodes 112B to the second curved reflective mirror 116B, and the second curved reflective mirror 116B converges the laser beams coming from the first curved reflective mirror 114B into the collimated excitation beams L6 and reflects the collimated excitation beams L6 to the opening 115B of the first curved reflective mirror 114B, such that the collimated excitation beams L6 pass through the opening 115B of the first curved reflective mirror 114B. In the embodiment, the reflective surfaces of the first and second curved reflective mirrors 114B and 116B are concave surfaces. Thereby, the excitation beams L6 emitted by the excitation light source module 110B can be transmitted to the wavelength conversion device through the hole of the light-splitting unit in an efficient manner according to the embodiment.

To sum up, the light-splitting unit of the illumination system provided in an embodiment of the invention has the hole that allows the excitation beam emitted by the wavelength conversion device to pass through, and the excitation beam is then transmitted to the wavelength conversion device. The wavelength conversion device has the wavelength conversion area and the diffusion area and thus can reflect the conversion beam and the diffused excitation beam to the light-splitting unit. The light-splitting unit not only can reflect the conversion beam but also can reflect the reflected excitation beam by means of the first optical film or the reflective substrate, such that the reflected excitation beam and the conversion beam can be transmitted out of the illumination system along the substantially identical direction and location. Since the illumination system described herein does not require any additional optical device for reflecting or refracting the excitation beam and the conversion beam coming from the wavelength conversion beam, the illumination system can have the reduced volume, and the optical quality of the conversion beam can be consistent with that of the excitation beam. On the other hand, based on the location of the first optical film, the hole may be formed in the light-splitting unit. Since it is not necessary to assemble or adhere plural optical films together, the light-splitting unit provided above can be formed with ease. The optical quality of the light-splitting unit formed by plural assembled or adhered optical films is easily affected by the degradation of the adhesives applied for adhesion; by contrast, the durability of the light-splitting unit described herein is rather satisfactory. Moreover, the projection apparatus provided herein is equipped with said illumination system and can thus have the reduced volume. In addition, the illumination system can provide the uniform beams, the projection apparatus is capable of providing the images with favorable quality. In another aspect, since the projection apparatus provided herein is equipped with the above-mentioned illumination system, the projection apparatus can be formed with ease, and the durability of the projection apparatus is satisfactory.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination system comprising:
   an excitation light source module configured to emit an excitation beam;
   a wavelength conversion device located on a transmission path of the excitation beam, the wavelength conversion device having at least one wavelength conversion area and a diffusion area, the at least one wavelength conversion area and the diffusion area cutting into the transmission path of the excitation beam by turns; and
   a light-splitting unit located on the transmission path of the excitation beam and between the excitation light source module and the wavelength conversion device, the light-splitting unit comprising:
     a transparent substrate; and
     a first optical film located on a side of the transparent substrate facing away from the wavelength conversion device, the first optical film having a hole, the excitation beam emitted from the excitation light source module being transmitted to the wavelength conversion device through the hole, wherein the at least one wavelength conversion area cutting into the transmission path of the excitation beam converts the excitation beam into a conversion beam, the conversion beam is transmitted to the light-splitting unit, a wavelength of the conversion beam is different from a wavelength of the excitation beam, the diffusion area cutting into the transmission path of the excitation beam reflects the excitation beam to become a reflected excitation beam and the reflected excitation beam is transmitted to the light-splitting unit, a part of the first optical film facing the excitation light source module reflects the reflected excitation beam coming from the diffusion area of the wavelength conversion device, and the part of the first optical film does not reflect the conversion beam coming from the at least one wavelength conversion area.

2. The illumination system of claim 1, wherein the light-splitting unit further comprises a second optical film disposed on the transparent substrate and configured to reflect the conversion beam coming from the at least one wavelength conversion area.

3. The illumination system of claim 2, wherein the first optical film is a reflective film, the second optical film is a dichroic film and pervious to the excitation beam, and the second optical film is adapted to reflect the conversion beam.

4. The illumination system of claim 2, wherein the first optical film is a first dichroic film and pervious to the conversion beam, the second optical film is a second dichroic film and pervious to the excitation beam, the first dichroic film is adapted to reflect the excitation beam, and the second optical film is adapted to reflect the conversion beam.

5. The illumination system of claim 1, wherein the first optical film is a reflective film.

6. The illumination system of claim 1, wherein the hole is located in a center of the first optical film or deviates from the center of the first optical film.

7. The illumination system of claim 1, wherein a shape of the hole is circular, rectangular, polygonal, or irregular.

8. The illumination system of claim 1, wherein the wavelength conversion device comprises:
   a reflective substrate having surface micro-structures located in the diffusion area; and
   a fluorescent layer located on the reflective substrate and in the at least one wavelength conversion area, the fluorescent layer being configured to convert the excitation beam into the conversion beam.

9. The illumination system of claim 1, wherein the wavelength conversion device comprises:
   a reflective substrate;
   a fluorescent layer located on the reflective substrate and in the at least one wavelength conversion area, the fluorescent layer being configured to convert the excitation beam into the conversion beam; and
   a diffusion film located on the reflective substrate and in the diffusion area.

10. The illumination system of claim 1, wherein the wavelength conversion device comprises:
    a transparent substrate;
    a fluorescent layer located on the transparent substrate and in the at least one wavelength conversion area, the fluorescent layer being configured to convert the excitation beam into the conversion beam;
    a diffusion film located on the transparent substrate and in the diffusion area; and
    a reflective layer located on the transparent substrate, a distribution range of the reflective layer covering the at least one wavelength conversion area and the diffusion area.

11. The illumination system of claim 1, wherein the excitation light source module comprises:
    a plurality of laser diodes respectively emitting a plurality of laser beams;
    a first curved reflective mirror having an opening; and
    a second curved reflective mirror, wherein the first curved reflective mirror reflects the laser beams emitted from the laser diodes to the second curved reflective mirror, the second curved reflective mirror reflects the laser beams to the opening, such that the laser beams pass through the opening of the first curved reflective mirror and generate the excitation beam being collimated.

12. The illumination system of claim 1, wherein the excitation light source module comprises:
    a plurality of laser diodes respectively emitting a plurality of laser beams;
    a first curved reflective mirror disposed in an inclined manner with respect to transmission paths of the laser beams emitted from the laser diodes; and
    a second curved reflective mirror, wherein the first curved reflective mirror reflects the laser beams emitted from the laser diodes to the second curved reflective mirror, the second curved reflective mirror is disposed in an inclined manner with respect to transmission paths of the laser beams coming from the first curved reflective mirror, the second curved reflective mirror reflects the laser beams coming from the first curved reflective mirror and generates the excitation beam being collimated.

13. The illumination system of claim 1, wherein the wavelength conversion device is a wheel adapted to rotation, such that the at least one wavelength conversion area and the diffusion area cut into the transmission path of the excitation beam by turns.

14. A projection apparatus comprising:
    an illumination system comprising:
        an excitation light source module configured to emit an excitation beam;
        a wavelength conversion device located on a transmission path of the excitation beam, the wavelength conversion device having at least one wavelength conversion area and a diffusion area, the at least one wavelength conversion area and the diffusion area cutting into the transmission path of the excitation beam by turns; and
        a light-splitting unit located on the transmission path of the excitation beam and between the excitation light source module and the wavelength conversion device, the light-splitting unit comprising:
            a transparent substrate; and
            a first optical film located on a side of the transparent substrate facing away from the wavelength conversion device, the first optical film having a hole, the excitation beam emitted from the excitation light source module being transmitted to the wavelength conversion device through the hole, wherein the at least one wavelength conversion area cutting into the transmission path of the excitation beam converts the excitation beam into a conversion beam, the conversion beam is transmitted to the light-splitting unit, a wavelength of the conversion beam is different from a wavelength of the excitation beam, the diffusion area cutting into the transmission path of the excitation beam reflects the excitation beam to become a reflected excitation beam and the reflected excitation beam is transmitted to the light-splitting unit, a part of the first optical film facing the excitation light source module reflects the reflected excitation beam coming from the diffusion area of the wavelength conversion device, and the part of the first optical film does not reflect the conversion beam coming from the at least one wavelength conversion area;
    a light valve located on the transmission path of the excitation beam and the conversion beam coming from the light-splitting unit, so as to modulate the conversion beam and the excitation beam to generate an image beam; and
    a lens device located on a transmission path of the image beam.

15. The projection apparatus of claim 14, wherein the light-splitting unit further comprises a second optical film disposed on the transparent substrate and configured to reflect the conversion beam coming from the at least one wavelength conversion area.

16. The projection apparatus of claim 15, wherein the first optical film is a reflective film, the second optical film is a dichroic film and pervious to the excitation beam, and the second optical film is adapted for reflecting the conversion beam.

17. The projection apparatus of claim 15, wherein the first optical film is a first dichroic film and pervious to the conversion beam, the second optical film is a second dichroic film and pervious to the excitation beam, the first dichroic film is adapted to reflect the excitation beam, and the second optical film is adapted to reflect the conversion beam.

18. The projection apparatus of claim 14, wherein the first optical film is a reflective film.

19. The projection apparatus of claim 14, wherein the hole is located in a center of the first optical film or deviates from the center of the first optical film.

20. The projection apparatus of claim 14, wherein a shape of the hole is circular, rectangular, polygonal, or irregular.

* * * * *